(12) United States Patent
Niwata et al.

(10) Patent No.: US 10,597,244 B2
(45) Date of Patent: Mar. 24, 2020

(54) GUIDING TRAY FOR DOCUMENT CONVEYING APPARATUS

(71) Applicant: PFU LIMITED, Kahoku-shi, Ishikawa (JP)

(72) Inventors: Tomoyuki Niwata, Kahoku (JP); Kiichiro Shimosaka, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 16/124,088

(22) Filed: Sep. 6, 2018

(65) Prior Publication Data
US 2019/0185281 A1    Jun. 20, 2019

(30) Foreign Application Priority Data
Dec. 20, 2017 (JP) ................. 2017-244143

(51) Int. Cl.
| B65H 1/30 | (2006.01) |
| B65H 5/38 | (2006.01) |
| H04N 1/00 | (2006.01) |
| B65H 9/04 | (2006.01) |

(52) U.S. Cl.
CPC .............. *B65H 5/38* (2013.01); *B65H 9/04* (2013.01); *H04N 1/00588* (2013.01); *B65H 1/30* (2013.01); *B65H 2405/141* (2013.01); *B65H 2405/332* (2013.01); *B65H 2511/12* (2013.01); *B65H 2801/06* (2013.01)

(58) Field of Classification Search
CPC .. B65H 1/30; B65H 2301/23; B65H 2405/33; B65H 2405/332; B65H 2405/115; B65H 2405/141
See application file for complete search history.

(56) References Cited

U.S. PATENT DOCUMENTS

| 5,624,107 A * | 4/1997 | Deguchi ................ G03G 15/60 |
| | | 271/145 |
| 2002/0093134 A1 | 7/2002 | Minakawa |
| 2014/0292971 A1 * | 10/2014 | Uchino .................. B41J 13/103 |
| | | 347/104 |

FOREIGN PATENT DOCUMENTS

| JP | 63-272727 A | 11/1988 |
| JP | 2002-274701 A | 9/2002 |
| JP | 2007-84173 A | 4/2007 |
| JP | 2007-251479 A | 9/2007 |

* cited by examiner

*Primary Examiner* — Howard J Sanders
(74) *Attorney, Agent, or Firm* — Lewis Roca Rothgerber Christie LLP

(57) ABSTRACT

The document conveying apparatus includes a body, a document tray, a guiding tray, a first support member that supports the document tray movably between a open position where a document is placed on the first document stacking face, and a close position where the document tray is closed, and a second support member that supports the guiding tray. The second support member positions the guiding tray at a first distance from the document tray, when the document tray is at the open position. The second support member positions the guiding tray at a second distance from the document tray, when the document tray is at the close position. The second distance is smaller than the first distance.

16 Claims, 12 Drawing Sheets

GUIDING TRAY FOR DOCUMENT CONVEYING APPARATUS

CROSS-REFERENCE TO RELATED APPLICATIONS

This application is based upon and claims the benefit of priority of prior Japanese Patent Application No. 2017-244143, filed on Dec. 20, 2017, the entire contents of which are incorporated herein by reference.

TECHNICAL FIELD

Embodiments discussed in the present specification relate to document conveying technology.

BACKGROUND

In a document conveying apparatus such as a scanner, etc., which feeds a document and captures an image, there is generally provided on a document tray a side guide for regulating the width direction of the document, and by conveying the document along the side guide, skew movement of the document is prevented. However, with a document conveying apparatus, it is occasionally necessary to feed a variety of documents with different widths to be imaged. In such a case, since the side guides are adjusted to both the sides of the document with the largest width, not all the documents can be conveyed along the side guides, so that some documents may be conveyed in a skewed attitude. When, for example, a plurality of document trays having a document stacking face with a width different from each other, it becomes possible to convey a plurality of documents having different widths satisfactorily.

A multistage document stacking tray is disclosed, in which two or more plural side regulating plates having different sizes for regulating the sides of documents are stacked to form confluent conveying paths that share a common document feed port, and on which documents having different size may be placed at the same time (see Japanese Unexamined Patent Publication (Kokai) No. S63-272727).

A scanner is disclosed, in which a main paper feed tray is provided in a main body of the scanner and an auxiliary paper feed tray dedicated to a document with a small width is provided in a main body of the scanner above the main paper feed tray (see Japanese Unexamined Publication (Kokai) No. 2007-251479).

SUMMARY

Generally, it is desired with respect to a document conveying apparatus to have a reduced size so that it may be compactly stored when not in use.

It is an object to reduce the size when not in use of a document conveying apparatus having a plurality of document trays.

According to an aspect of the apparatus, there is provided a document conveying apparatus. The document conveying apparatus includes a body, a document tray having a first document stacking face, a guiding tray having a second document stacking face, wherein a width of the second document stacking face is smaller than a width of the first document stacking face, a first support member that supports the document tray movably between a open position where a document is placed on the first document stacking face and a close position where the document tray is closed, and a second support member that supports the guiding tray. The second support member positions the guiding tray at a first distance from the document tray, when the document tray is at the open position. The second support member positions the guiding tray at a second distance from the document tray, when the document tray is at the close position, and wherein the second distance is smaller than the first distance.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, a document conveying apparatus, a control method, and computer program according to an embodiment, will be described with reference to the drawings. However, note that the technical scope of the invention is not limited to these embodiments and extends to the inventions described in the claims and their.

Figure 1A:
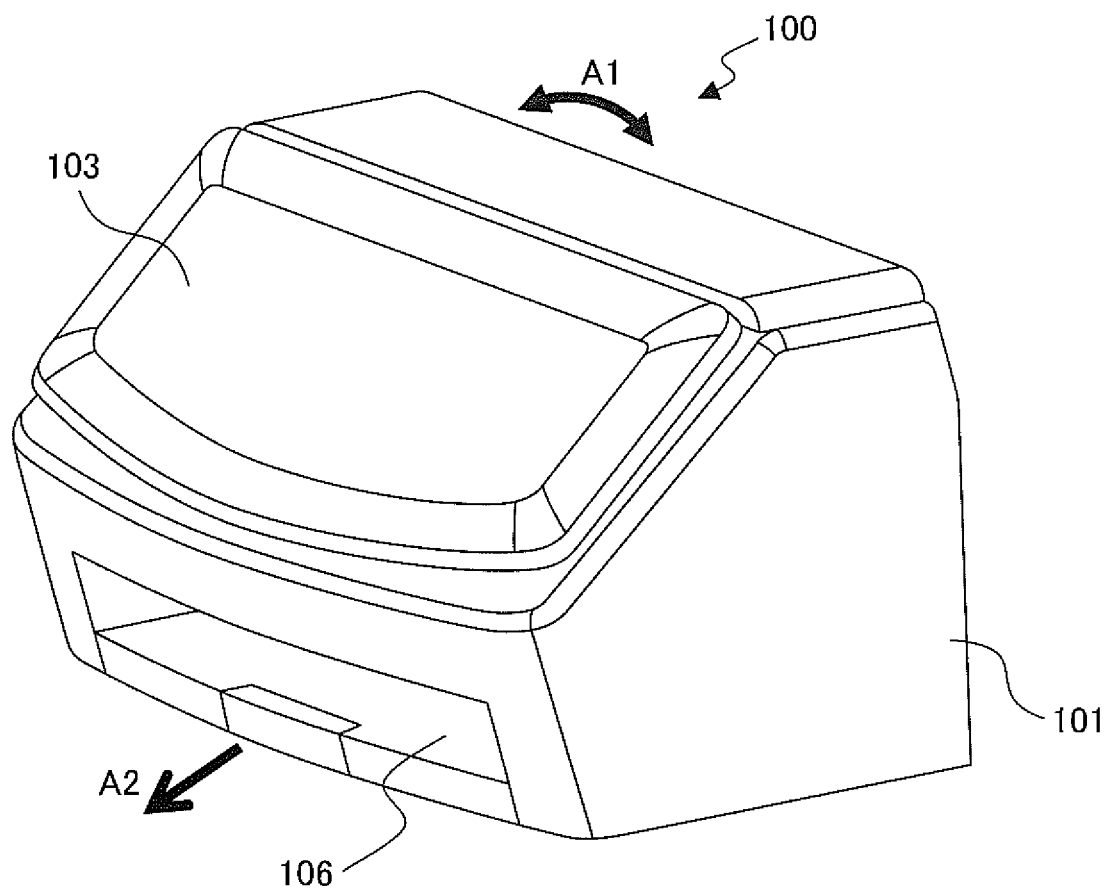
FIG. 1A is a perspective view illustrating a document conveying apparatus 100.
Figure 1B:
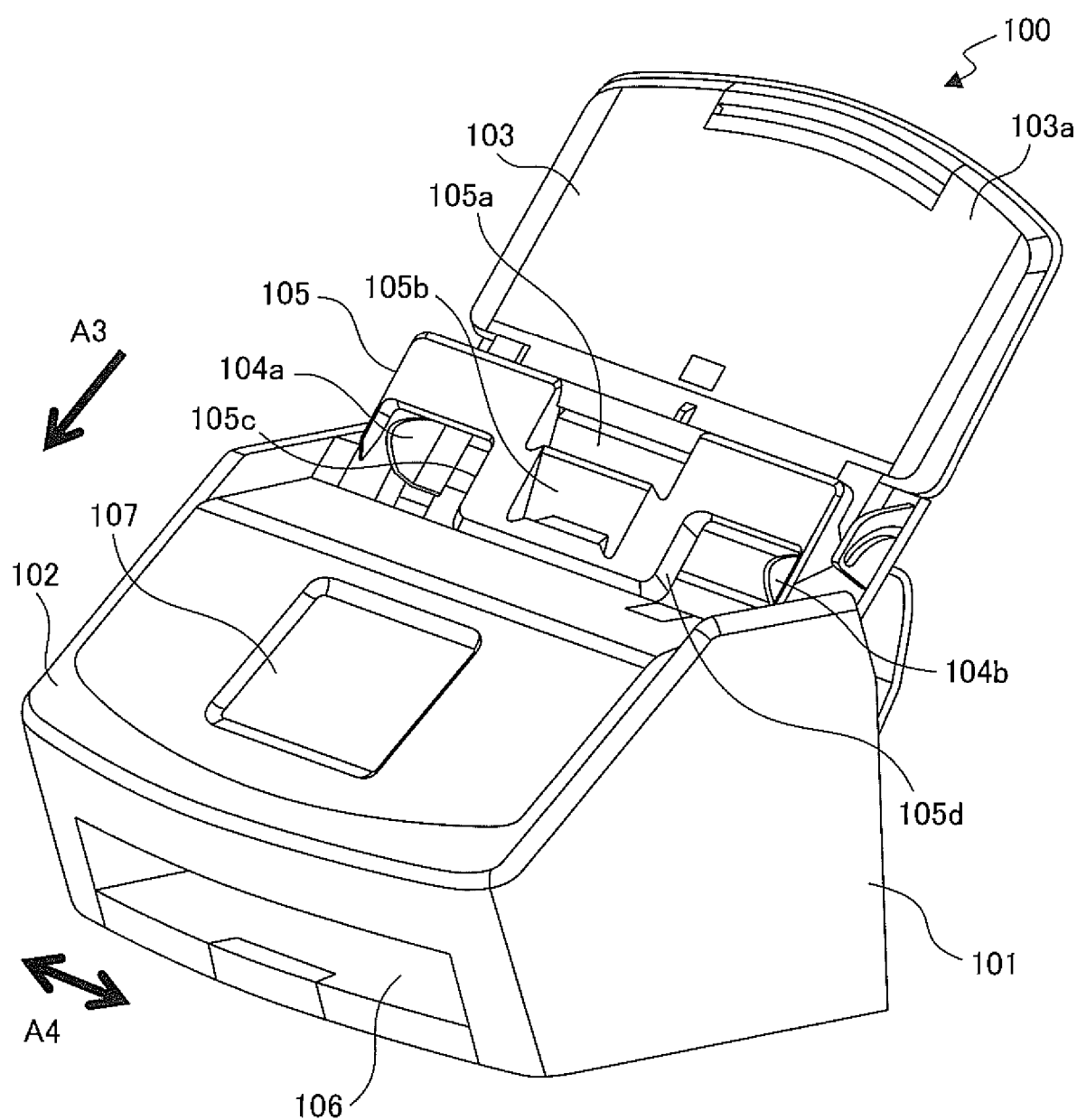
FIG. 1B is a perspective view illustrating a document conveying apparatus 100.

FIGS. 1A and 1B are perspective views illustrating a document conveying apparatus 100 configured as an image scanner. FIG. 1A depicts a state in which the document conveying apparatus 100 is not in use, and FIG. 1B depicts a state in which the document conveying apparatus 100 is in use.

The document conveying apparatus 100 is provided with a lower casing 101, an upper casing 102, a document tray 103, side guides 104a, and 104b, a guiding tray 105, a discharge tray 106, a display device 107, etc.

The lower casing 101 and the upper casing 102 are examples of the body, and are made of a resin material etc., and cover the respective devices placed inside the document conveying apparatus 100. The upper casing 102 is placed at a position covering the upper surface of the document conveying apparatus 100 and engages with the lower casing 101 with a hinge such that the upper casing 102 may be opened and closed when documents are jammed, or the inside of the document conveying apparatus 100 is cleaned.

The document tray 103 is formed of a resin material etc., and engages with the lower casing 101. The document tray 103 has a first document stacking face 103a for stacking documents. The width of the first document stacking face 103a is decided such that a document of, for example, A3 size or A4 size may be placed so as to direct its longitudinal direction along the document conveying direction A3. As depicted in FIG. 1A, the document tray 103 is disposed at a position to cover the upper casing 102 and the lower casing 101 where the document tray 103 is closed, when the document conveying apparatus 100 is not used, and functions as an external cover. On the other hand, as depicted in FIG. 1B, when the document conveying apparatus 100 is used, the document tray 103 is disposed at a position where a document can be placed, and functions as a document stacking tray. Hereinafter, the position at which the document tray 103 covers the upper casing 102 and the lower casing 101 may be referred to as a storage position, and the position at which the document tray 103 can accommodate a document may be referred to as a working position. The working position is an example of the open position, and the storage position is an example of the close position. The document tray 103 is provided so as to pivot in the direction of the arrow A1 and to reciprocate between the working position and the storage position.

The side guides 104a and 104b are mounted on the document tray 103 movably in the direction A4 orthogonal to the document conveying direction A3. The side guides 104a and 104b are positioned according to the width of the document placed on the first document stacking face 103a, and regulate the width direction of the document. Hereinafter, the side guides 104a and 104b may be sometimes referred to collectively as a side guide 104.

The guiding tray 105 is formed of a resin material etc., and is detachably provided on the document tray 103. The guiding tray 105 has a second document stacking face 105a and a third document stacking face 105b for stacking documents. The width of the second document stacking face 105a is set, for example, to a size allowing placement of a common business card such that the transverse direction orients the document conveying direction A3. The width of the third document stacking face 105b is set, for example, to a size allowing placement of a common receipt such that its longitudinal direction orients the document conveying direction A3. In this way, the width of the second document stacking face 105a is smaller than the width of the first document stacking face 103a, and the width of the third document stacking face 105b is further smaller than the width of the second document stacking face 105a.

The guiding tray 105 has side faces 105c and 105d at positions facing the side guides 104a and 104b, respectively. The side faces 105c and 105d function as stoppers for preventing the side guide 104 from approaching to a position facing the second document stacking face 105a on the document tray 103 in the direction A4 orthogonal to the document conveying direction A3. As a result, the width is restricted by the side guide 104 such that it is larger than the width of the second document stacking face 105a. A user can clearly judge on which document stacking face a document should be placed in accordance with the size of the document, and consequently the document conveying apparatus 100 can improve the user convenience.

The discharge tray 106 is stored inside the lower casing 101 such that it can be drawn out in the direction of the arrow A2, and in a state where it is drawn out, it is possible to retain a discharged document.

The display device 107 includes a display constituted with a liquid crystal, an organic EL (Electro-Luminescence), etc., and an interface circuit for outputting image data to the display, and displays the image data on a display. The display device 107 includes further a touch panel type input device, and an interface circuit for acquiring a signal from the input device, accepts an input by a user, and outputs a signal corresponding to the input by the user.

Figure 2:
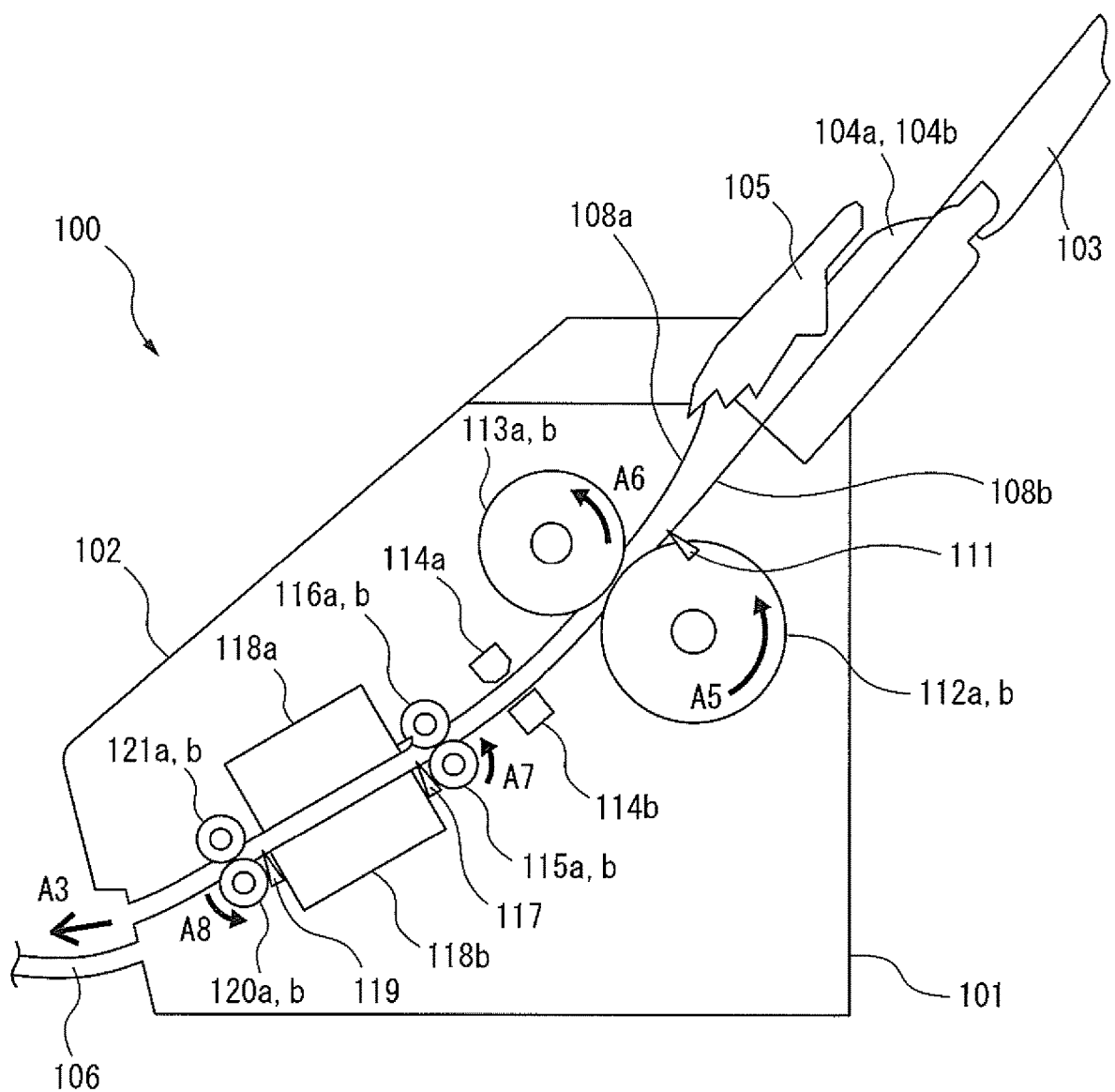
FIG. 2 is a diagram for illustrating a conveying path inside a document conveying apparatus 100.

FIG. 2 is a diagram for illustrating a conveying path inside a document conveying apparatus 100.

In the conveying path inside the document conveying apparatus 100, there are a first sensor 111, paper feed rollers 112a and 112b, retard rollers 113a and 113b, an ultrasonic transmitter 114a, an ultrasonic receiver 114b, first conveying rollers 115a and 115b, first driven rollers 116a and 116b, a second sensor 117, a first imaging device 118a, a second imaging device 118b, a third sensor 119, second conveying rollers 120a and 120b, second driven rollers 121a and 121b, etc.

Hereinafter, the paper feed rollers 112a and 112b may be sometimes collectively referred to as a paper feed roller 112. Further, the retard rollers 113a and 113b may be sometimes collectively referred to as a retard roller 113. Further, the first conveying rollers 115a and 115b may be sometimes collectively referred to as a first conveying roller 115. Further, the first driven rollers 116a and 116b may be sometimes collectively referred to as a first driven roller 116. Further, the second conveying rollers 120a and 120b may be sometimes collectively referred to as a second conveying roller 120. Further, the second driven rollers 121a and 121b may be sometimes collectively referred to as a second driven roller 121.

The lower surface of the upper casing 102 constitutes an upper guide 108a of the document conveying path, and the upper surface of the lower casing 101 constitutes a lower guide 108b of the document conveying path. In FIG. 2, the arrow A3 indicates the document conveying direction. Hereinafter, upstream means upstream in the document conveying direction A3, and downstream means downstream in the document conveying direction A3.

The first sensor 111 is a contact detection sensor, which is disposed on the upstream side of the paper feed roller 112 and the retard roller 113, and detects whether or not a document is placed on the document tray 103 or the guiding tray 105.

The ultrasonic transmitter 114a and the ultrasonic receiver 114b are disposed in the vicinity of the document conveying path facing each other across the conveying path. The ultrasonic transmitter 114a transmits ultrasonic waves. Meanwhile, the ultrasonic receiver 114b detects the ultrasonic wave transmitted by the ultrasonic transmitter 114a and having passed through a document, generates and outputs an ultrasonic wave signal, which is an electric signal corresponding to the detected ultrasonic wave. Hereinafter, the ultrasonic transmitter 114a and the ultrasonic receiver 114b may be sometimes collectively referred to as an ultrasonic sensor 114.

The second sensor 117 is a contact detection sensor, and is disposed on the downstream side of the first conveying roller 115 and the first driven roller 116 and on the upstream side of the first imaging device 118a and the second imaging device 118b. The second sensor 117 detects the presence of a document between the first conveying roller 115 and first driven roller 116, and the first imaging device 118a and second imaging device 118b in the document conveying direction A3.

The first imaging device 118a has a CIS (Contact Image Sensor) of an equal magnification optical system type provided with an image pick-up device with CCDs (Charge Coupled Devices) linearly arranged in the main scanning direction. The first imaging device 118a scans and captures an image of the back side of a document, and generates and outputs an image signal. The first imaging device 118a has a light source for illuminating the back side of a document, and a white reference plate to be used for correcting the image captured by the second imaging device 118b.

Similarly, the second imaging device 118b has a CIS of an equal magnification optical system type provided with an image pick-up device with CCDs linearly arranged in the main scanning direction. The second imaging device 118b scans and captures an image of the top side of a document, and generates and outputs an image signal. The second imaging device 118b has a light source for illuminating the top side of a document, and a white reference plate to be used for correcting the image captured by the first imaging device 118a.

In this regard, CMOS (Complementary Metal Oxide Semiconductor) may be used instead of CCD. Further, instead of CIS, an imaging sensor of a reduction optical system type may be used. Hereinafter, the first imaging device 118a and the second imaging device 118b may be sometimes collectively referred to as an imaging device 118.

A document placed on the document tray 103 or the guiding tray 105 is conveyed between the upper guide 108a and the lower guide 108b in the document conveying direction A3 by rotation of the paper feed roller 112 in the direction of the arrow A5 in FIG. 2. The retard roller 113 rotates in the direction of the arrow A6 in FIG. 2 in conveying a document. When a plurality of documents is placed on the document tray 103 or the guiding tray 105, only a document contacting the paper feed roller 112 out of the documents placed on the document tray 103 or the guiding tray 105 is separated by the functions of the paper feed roller 112 and the retard roller 113. In this way, the paper feed roller 112 and the retard roller 113 function as a conveying unit (roller) that conveys a document, and at the same time function as a separating unit (roller) that separates a document and inhibits conveyance of documents other than the separated document (prevention of multifeed).

A document is fed between the first conveying roller 115 and the first driven roller 116 under the guide of the upper guide 108a and the lower guide 108b. The document is sent between the first imaging device 118a and the second imaging device 118b by the rotation of the first conveying roller 115 in the direction of the arrow A7 in FIG. 2. The document read by the imaging device 118 is discharged onto the discharge tray 106 by the rotation of the second conveying roller 120 in the direction of the arrow A8 in FIG. 2.

Figure 3A:
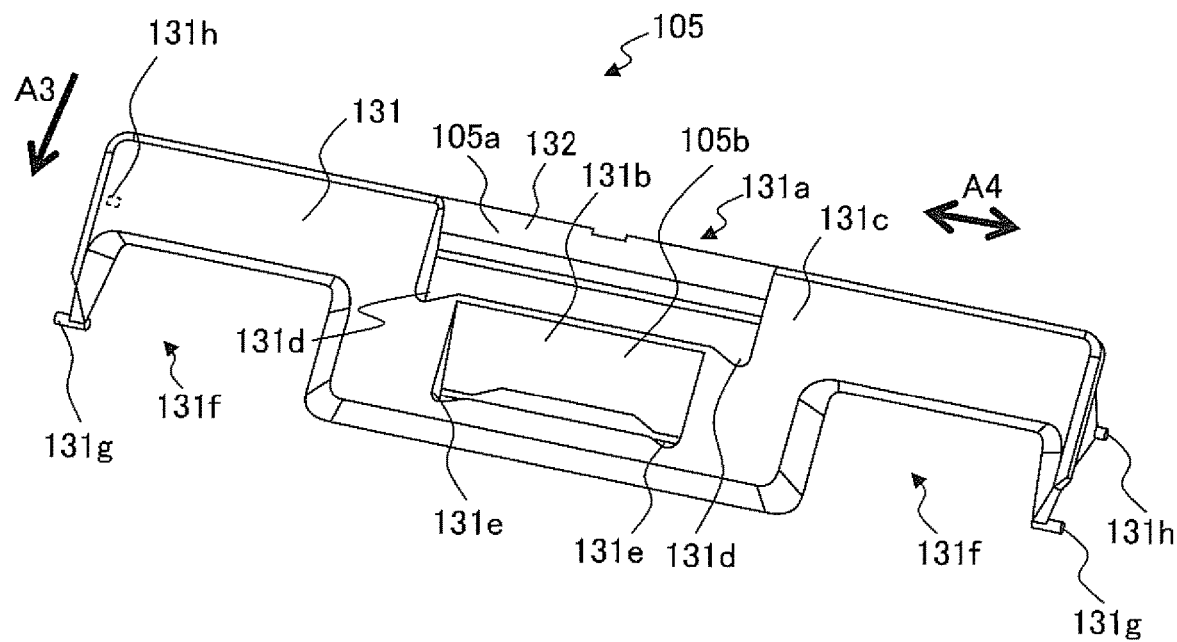
FIG. 3A is a schematic diagram illustrating the guiding tray 105.
Figure 3B:
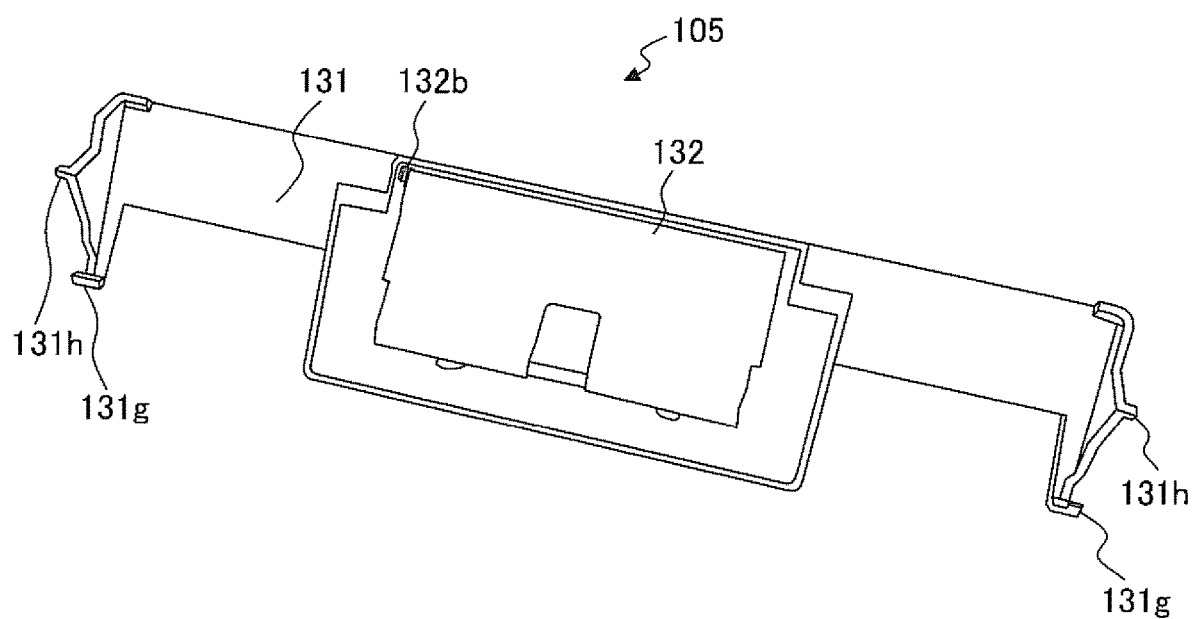
FIG. 3B is a schematic diagram illustrating the guiding tray 105.
Figure 4A:
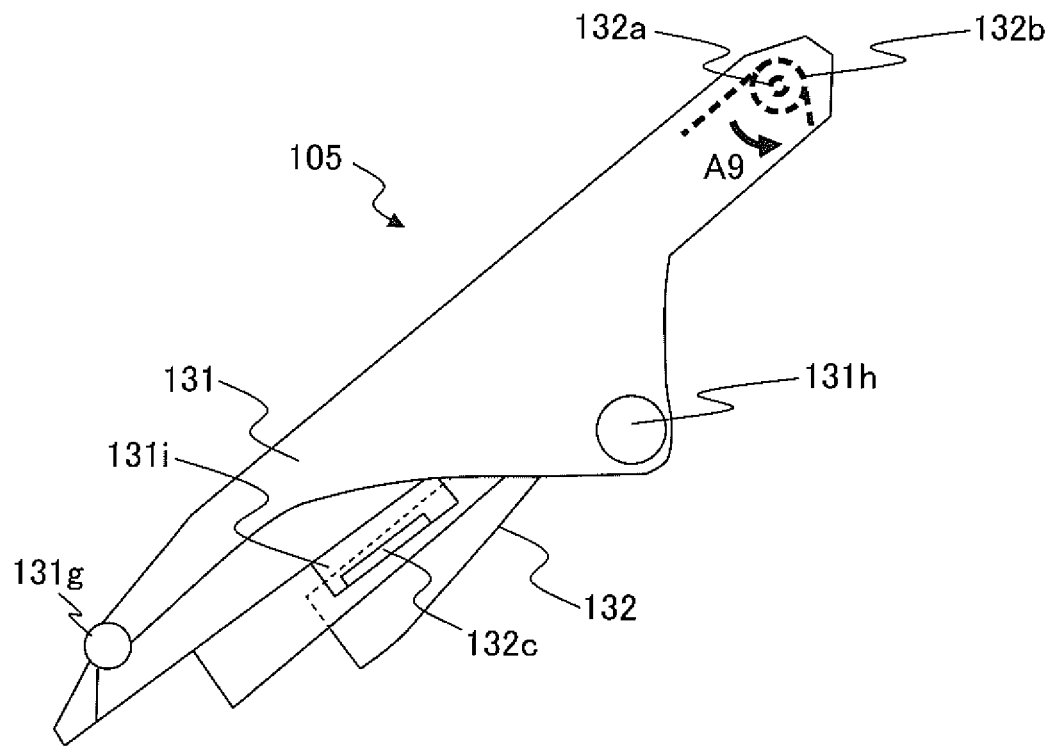
FIG. 4A is a schematic diagram illustrating the guiding tray 105.
Figure 4B:
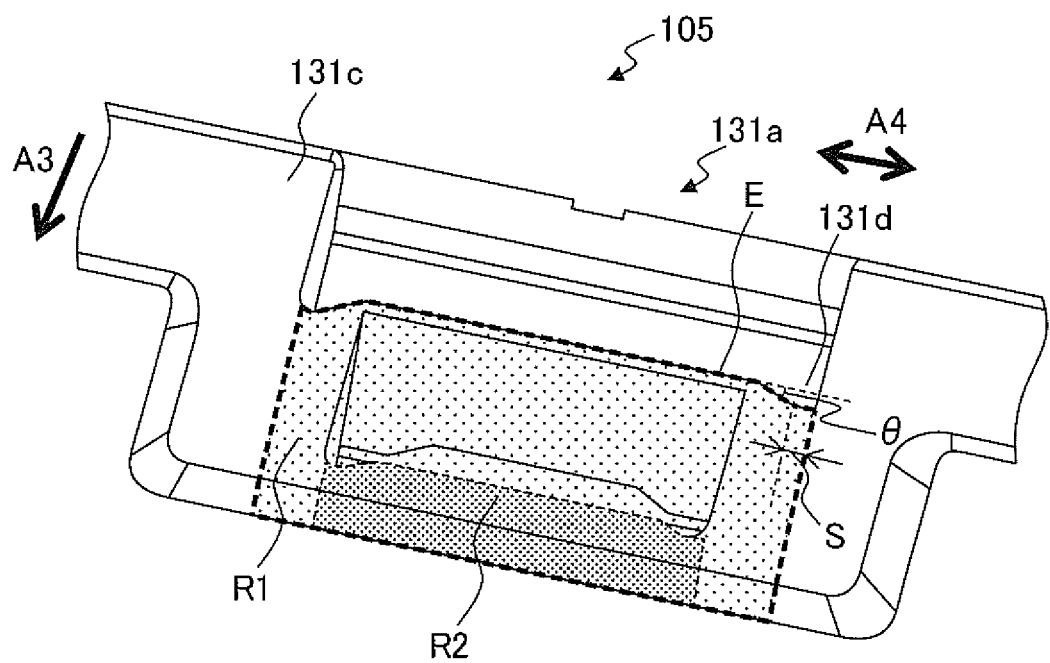
FIG. 4B is a schematic diagram illustrating the guiding tray 105.

FIGS. 3A, 3B, 4A, and 4B are schematic diagrams illustrating the guiding tray 105. FIG. 3A is a perspective view of the guiding tray 105 demounted from the document conveying apparatus 100, as viewed obliquely from above, and FIG. 3B is a perspective view of the guiding tray 105 as viewed obliquely from below. Meanwhile, FIG. 4A is a side view of the guiding tray 105, and FIG. 4B is an enlarged view of the guiding tray 105.

As illustrated in FIGS. 3A, 3B, and 4A, the guiding tray 105 has a base material 131 and a swinging member 132.

In the base material 131 at the central region in the direction A4 orthogonal to the document conveying direction A3, a recess 131a directed toward the downstream side in the document conveying direction A3 is provided, and the swinging member 132 is supported in the position of a recess 131a. Further, in the base material 131, a groove 131b having a width less than the width of the swinging member 132 is provided in a region on the inner side of the recess 131a in the direction A4 orthogonal to the document conveying direction A3, and on the downstream side of the recess 131a in the document conveying direction A3. The swinging member 132 functions as a second document stacking face 105a and guides a placed document to the paper feed roller 112 and the retard roller 113. The groove 131b functions as a third document stacking face 105b and guides a placed document to the paper feed roller 112 and the retard roller 113.

The swinging member 132 is supported at an axis member 132a as an axis point by the base material 131 swingably in the direction of the arrow A9 in FIG. 4A. Between the base material 131 and the swinging member 132, a torsion coil spring 132b is provided as an elastic member around the axis member 132a. The swinging member 132 is provided with a projecting member 132c, and the base material 131 is provided with a hole 131i in which the projecting member 132c is movable.

A force is applied to the swinging member 132 in the direction of the arrow A9 by the torsion coil spring 132b, and when the document tray 103 moves from the storage position to the working position, the swinging member 132 swings in the direction of the arrow A9. In doing so, the projecting member 132c abuts on the lower end of the hole 131i, and the swinging member 132 is locked at the position depicted in FIG. 4A. On the other hand, when the document tray 103 is moved from the working position to the storage position, the swinging member 132 is pushed by the document tray 103 and swings in a direction opposite to the arrow A9, and locked when the projecting member 132c abuts on the upper end of the hole 131i.

As a result, when the document tray 103 is at the working position, the distance between the base material 131 and the swinging member 132 increases, and a sufficient amount of documents may be placed on the guiding tray 105 collectively. On the other hand, when the document tray 103 is at the storage position, the distance between the base material 131 and the swinging member 132 decreases, and the guiding tray 105 may be stored compactly between the lower casing 101 and upper casing 102, and the document tray 103.

In this regard, it is not prerequisite to provide an elastic member between the base material 131 and the swinging member 132 in the document conveying apparatus 100. Without the same, the swinging member 132 swings in the direction of the arrow A9 due to its own weight when the document tray 103 is at the working position, and swings in the direction opposite to the direction of the arrow A9 due to its own weight when the document tray 103 is at the storage position. On the other hand, in a case where an elastic member is provided between the base material 131 and the swinging member 132, the swinging member 132 may be stabilized when the document tray 103 moves to the working position.

Further, the guiding tray 105 functions as a retaining member that retains documents placed on the first document stacking face 103a. Further, in the guiding tray 105, a portion (region R1 in FIG. 4B) facing the swinging member 132 in the direction A4 orthogonal to the document conveying direction A3 functions as a retaining member that retains documents placed on the second document stacking face 105a. Further, in the guiding tray 105, a portion (region R2 in FIG. 4B) facing the groove 131b in the direction A4 orthogonal to the document conveying direction A3 functions as a retaining member that retains documents placed on the third document stacking face 105b. Even when a folded document sheet or a skewed document sheet is placed on any of the document stacking faces, the stacked document may be prevented by the respective retaining members from flopping forward (onto the side of the display device 107) and falling down from the document tray. As a result, it is not any more necessary for the user to hold the stacked documents by hand, and therefore the user convenience of the document conveying apparatus 100 may be improved.

Further, notches 131d are provided on the top surface 131c of the base material 131, in both regions at the ends of the recess 131a in the direction A4 orthogonal to the document conveying direction A3 and at the downstream end of the recess 131a in the document conveying direction A3. When the notches 131d are provided, even in a case where a document, which edge may be folded or skewed, is placed on the second document stacking face 105a, a space allowing such an edge to escape may be secured. This makes it easier for a user to place a document, which edge is folded or skewed, and therefore the user convenience of the document conveying apparatus 100 may be improved.

As depicted in FIG. 4B, the notch 131d is formed in a nearly trapezoidal shape from the side E extending in the direction A4 orthogonal to the document conveying direction A3 in the recess 131a toward the downstream side in the document conveying direction A3. In general, the skew angle of most of documents which edge is skewed is from 10° to 20°. Therefore, the angle θ of the notch 131d formed with respect to the side E (the base angle of a trapezoid), is preferably from 10° to 20°, and more preferably 15°. Further, when the size S of a side substantially parallel to the direction A4 orthogonal to the document conveying direction A3 (the side extending from the end of the notch 131d in the direction A4) among the sides forming the notch 131d in the recess 131a is too small, the edge of a document may not me released. On the other hand, when the size S is too large, there arises a higher risk that the region R1 of the guiding tray 105 functioning as a retaining member is not able to retain a document any more, and the document may flop forward (onto the side of the display device 107). Therefore, the size S is preferably from 1 mm to 5 mm, and more preferably 3 mm.

Similarly, notches 131e are provided in the base material 131, in both regions at the ends of the groove 131b in the direction A4 orthogonal to the document conveying direction A3 and at the downstream end of the groove 131b in the document conveying direction A3. When the notches 131e are provided, even in a case where a document, which edge may be folded or skewed, is placed on the third document stacking face 105b, a space allowing such an edge to escape may be secured. This makes it easier for a user to place a document, which edge is folded or skewed, and therefore the user convenience of the document conveying apparatus 100 may be improved. The angle θ and the size S with respect to the notch 131e are set similarly to the angle θ and the size S with respect to the notch 131d.

Further, in the base material 131, a concave portion 131f is provided in the outer region of the swinging member 132 in the direction A4 orthogonal to the document conveying direction A3, which is directed toward the upstream side in the document conveying direction A3. The side guide 104 can move in the spaces formed by the concave portion 131f.

Further, a first axis member 131g and an engaging member 131h are provided in the base material 131 at both the ends in the direction A4 orthogonal to the document conveying direction A3. The first axis member 131g and the engaging member 131h are used for supporting the guiding tray 105 at the document tray 103 or the lower casing 101.

Figure 5:
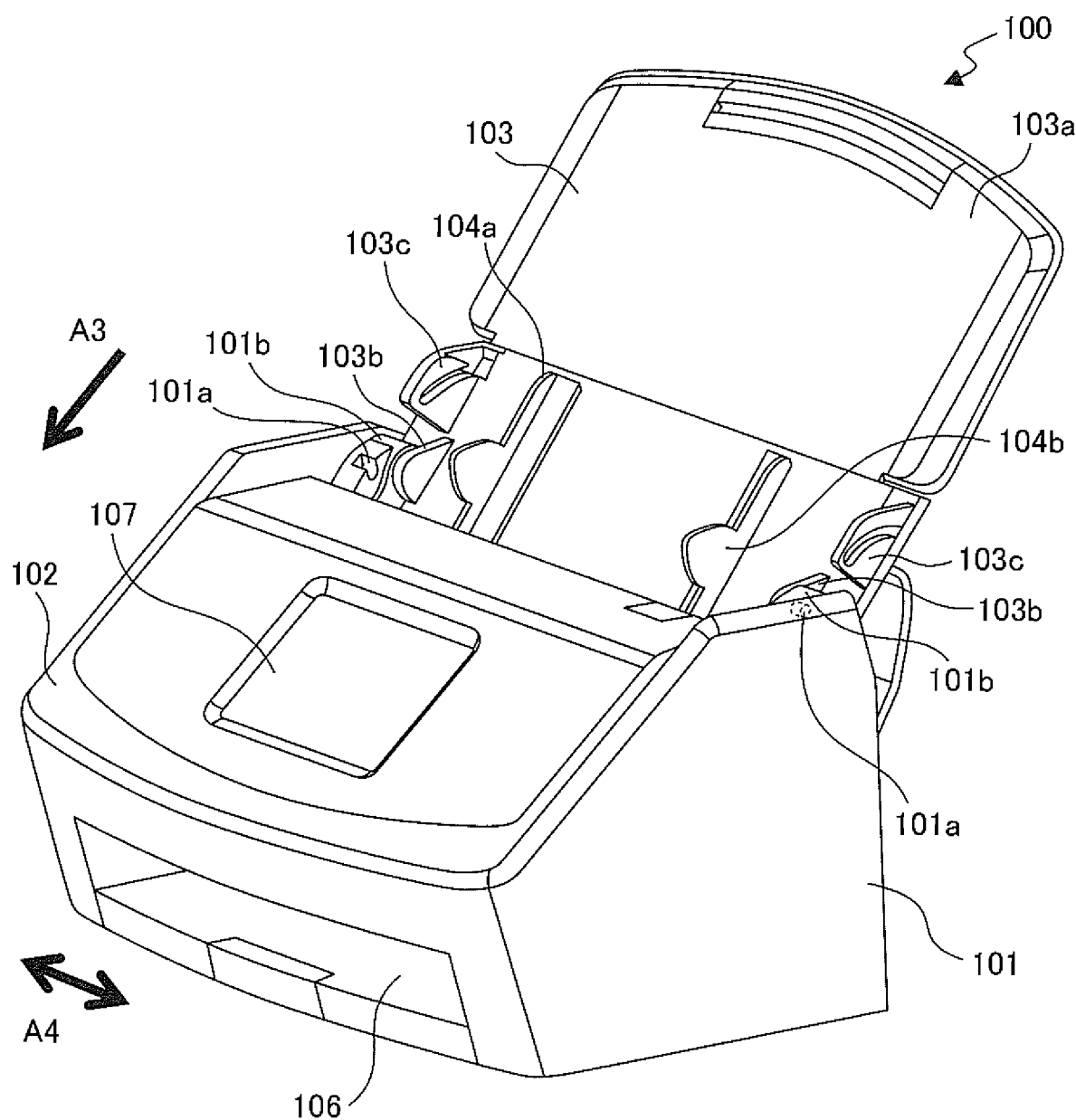
FIG. 5 is a diagram illustrating a support member.

FIG. 5 is a diagram illustrating a support member that supports the document tray 103 and the guiding tray 105. FIG. 5 is a perspective view of the document conveying apparatus 100 from which the guiding tray 105 is demounted.

As depicted in FIG. 5, the lower casing 101 is provided with a first bearing member 101a and a second bearing member 101b, and the document tray 103 is provided with a second axis member 103b and a guide member 103c. When the second axis member 103b engages with the second bearing member 101b, the document tray 103 is supported at the lower casing 101 rotatably around the second axis member 103b and the second bearing member 101b as the rotational axis point. The second axis member 103b and the second bearing member 101b are an example of a first support member that supports the document tray 103 movably between a working position and a storage position.

Meanwhile, when the first axis member 131g of the guiding tray 105 engages with the first bearing member 101a, the guiding tray 105 is rotatably supported by the lower casing 101 at the first axis member 131g and the first bearing member 101a as a rotational axis point. Further, when the engaging member 131h of the guiding tray 105 engages with the guide member 103c, the guiding tray 105 is supported such that the engaging member 131h moves along the guide member 103c in association with a movement of the document tray 103. A user can easily mount the guiding tray 105 onto the document conveying apparatus 100 by engaging the first axis member 131g with the first bearing member 101a, and the engaging member 131h with the guide member 103c respectively.

Figure 6A:
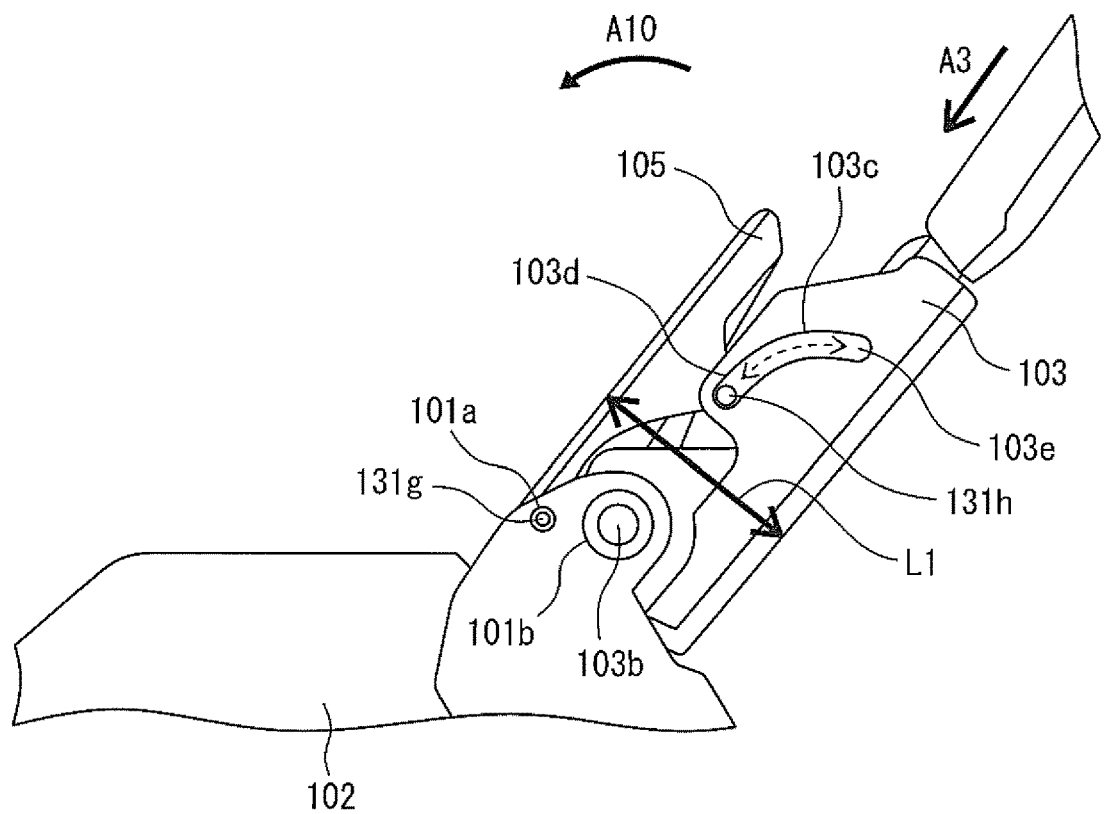
FIG. 6A is a diagram illustrating a change in the state of a guiding tray 105.
Figure 6B:
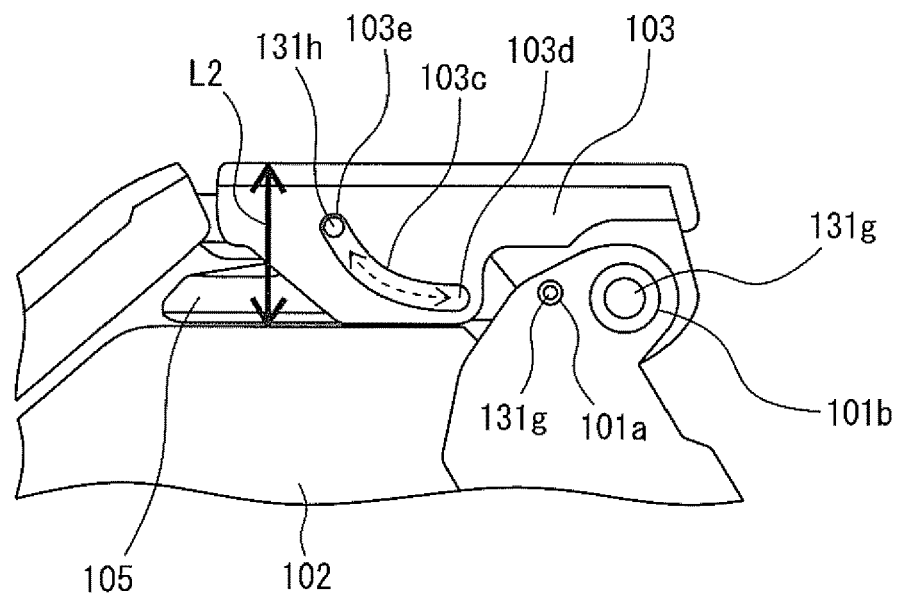
FIG. 6B is a diagram illustrating a change in the state of a guiding tray 105.

FIGS. 6A and 6B are diagrams illustrating a change in the state of the guiding tray 105 in association with a movement of the document tray 103.

FIG. 6A illustrates a state in which the document tray 103 is disposed at the working position, and FIG. 6B illustrates a state in which the document tray 103 is disposed at the storage position. As illustrated in FIGS. 6A and 6B, the slot of the guide member 103c is so configured to take a higher position (on the side of the guiding tray 105) at a more downstream position in the document conveying direction A3, and to take a lower position (on the side of the document tray 103) at a more upstream position in the document conveying direction A3.

As illustrated in FIG. 6A, when the document tray 103 is at the working position, the engaging member 131h is positioned at the downstream end 103d of the guide member 103c, and the guiding tray 105 is supported by the guide member 103c to be apart from the document tray 103 by a first distance L1. Then, when the document tray 103 is rotated in the direction of the arrow A10 around the second axis member 103b and the second bearing member 101b as a rotational axis point and moved to the storage position, in association with such rotation the guiding tray 105 is rotated around the first axis member 131g and the first bearing member 101a as a rotational axis point. On that occasion, the engaging member 131h moves from the downstream end 103d toward the upstream end 103e along the slot of the guide member 103c. Accordingly, as illustrated in FIG. 6B, when the document tray 103 is at the storage position, the engaging member 131h is positioned at the upstream end 103e of the guide member 103c, and the guiding tray 105 is supported by the guide member 103c so as to be apart from the document tray 103 by a second distance L2. In other words, the guide member 103c positions the guiding tray 105 at the first distance L1 from the document tray 103, when the document tray 103 is at the working position, and positions the guiding tray 105 at the second distance L2 from the document tray 103, when the document tray 103 is at the storage position.

The second distance L2 is smaller than the first distance L1. In the document conveying apparatus 100, the second distance L2 is made smaller than the first distance L1 by sliding the engaging member 131h in the guide member 103c while shifting the position of the rotational axis point of the guiding tray 105 from the position of the rotational axis point of the document tray 103. When the document tray 103 is at the working position, the first distance L1 between the guiding tray 105 and the document tray 103 is sufficiently large, and it is possible to place a large amount of document collectively on the guiding tray 105. On the other hand, when the document tray 103 is at the storage position, the second distance L2 between the guiding tray 105 and the document tray 103 is sufficiently small, and it is possible to store compactly the guiding tray 105 between the lower casing 101 and upper casing 102 and the document tray 103.

When the document tray 103 is moved to the working position, the guiding tray 105 is also moved automatically by the action of the guide member 103c and the engaging member 131h to a position where the document can be placed. On the other hand, when the document tray 103 is moved to the storage position, the guiding tray 105 is also automatically stored between the lower casing 101 and upper casing 102 and the document tray 103. A user can open and close the document tray 103 while mounting the guiding tray 105 on the document conveying apparatus 100, and therefore, the user convenience of the document conveying apparatus 100 may be improved.

In this manner, the guide member 103c engages with the engaging member 131h and guides the guiding tray 105 movably, when the document tray 103 moves from the working position to the storage position. The engaging member 131h and the guide member 103c, and the first axis member 131g and the first bearing member 101a are examples of a second support member that supports the guiding tray 105.

Figure 7:
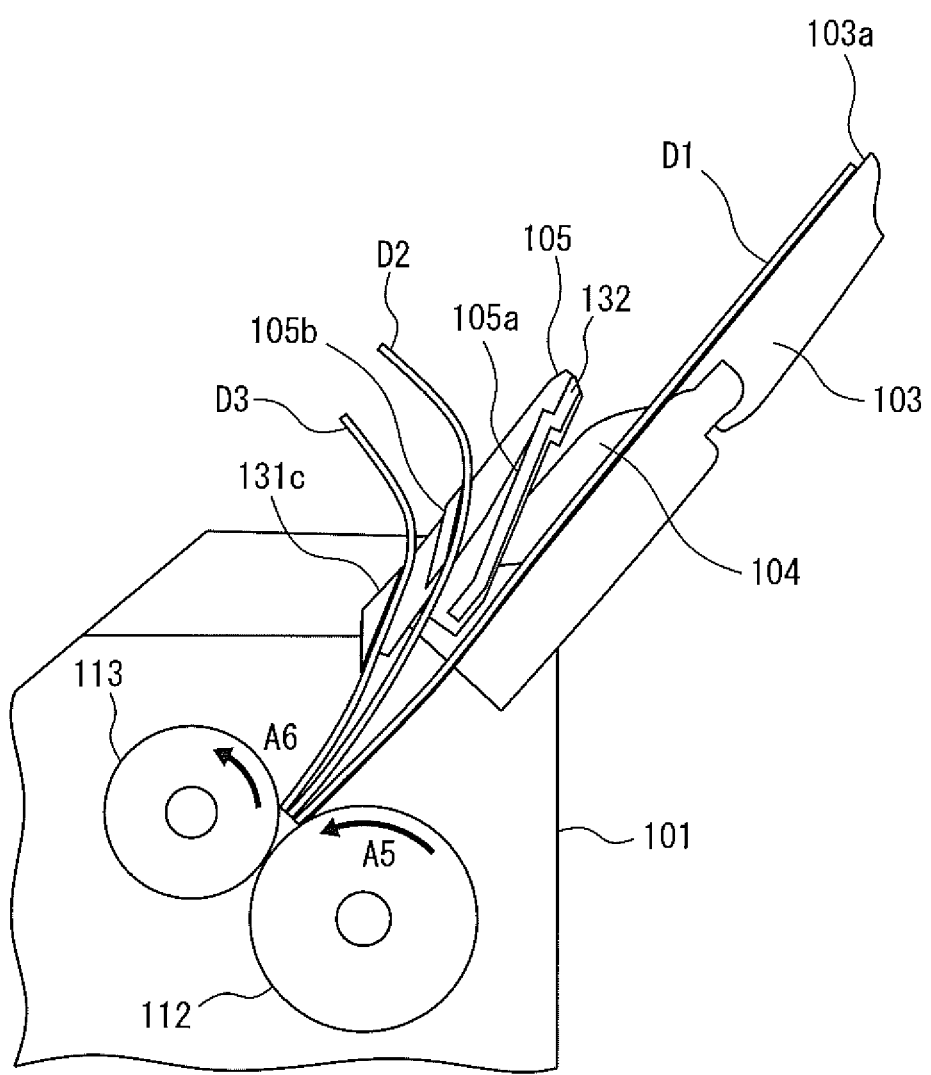
FIG. 7 is a diagram illustrating a state in which documents are stacked.

FIG. 7 is a diagram illustrating a state in which documents are stacked on the document tray 103 and the guiding tray 105.

As illustrated in FIG. 7, on the first document stacking face 103a of the document tray 103, the second document stacking face 105a of the guiding tray 105, and the third document stacking face 105b, the respective documents D1, D2, and D3 can be placed simultaneously (collectively). When the documents D1, D2, and D3 are placed on the first document stacking face 103a, the second document stacking face 105a, and the third document stacking face 105b, respectively, the paper feed roller 112 and the retard roller 113 convey first the document D1 placed at a lowermost position. After having conveyed the document D1, the paper feed roller 112 and the retard roller 113 convey the document D2 placed at a next lower level, and after having conveyed the document D2, convey the document D3 placed at a uppermost position.

As described above, the document conveying apparatus 100 conveys automatically and successively documents placed respectively on the first document stacking face 103a, the second document stacking face 105a, and the third document stacking face 105b. A user may set a plurality of documents of different sizes at the same time for scanning them collectively, which can improve the user convenience of the document conveying apparatus 100.

The paper feed roller 112 may be disposed not below the retard roller 113 but above the retard roller 113 in the document conveying apparatus 100. In that case, the paper feed roller 112 and the retard roller 113 convey first the document D3 placed on the uppermost side, and then in the order of the document D2 and the document D1.

Further, as illustrated in FIG. 7, the guiding tray 105 retains the document D1 placed on the first document stacking face 103a. Meanwhile, on the guiding tray 105, a portion facing the swinging member 132 (region R1 in FIG. 4B) retains the document D2 placed on the second document stacking face 105a. Further on the guiding tray 105, a portion facing the groove 131b (region R2 in FIG. 4B) retains the document D3 placed on the third document stacking face 105b. As a result, even when a folded document or a skewed document is placed on any of document stacking faces, the placed document is suppressed from flopping forward (onto the side of the display device 107), and falling down from the document tray.

Figure 8:
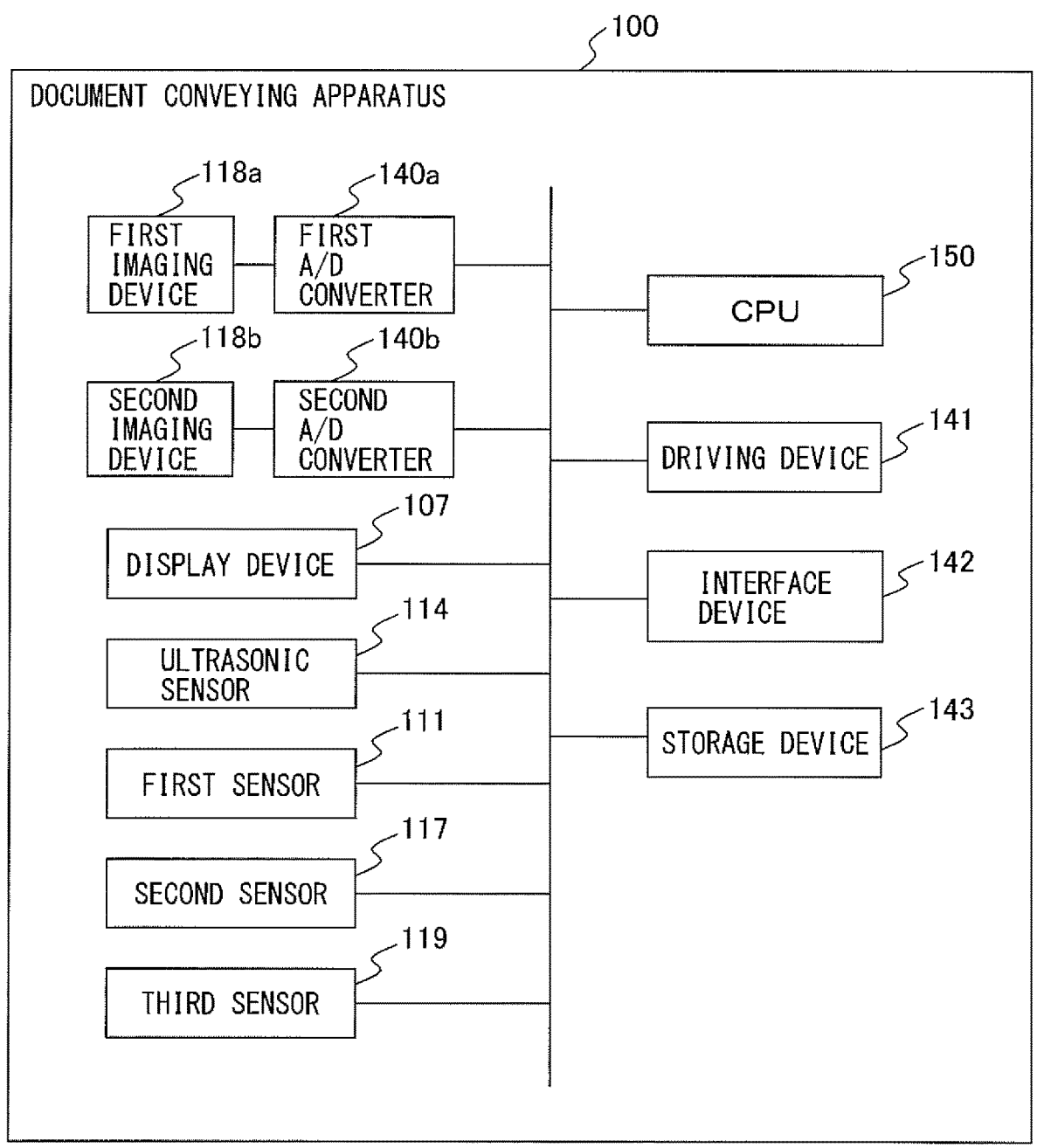
FIG. 8 is a block diagram describing a schematic configuration of a document conveying apparatus 100.

FIG. 8 is a block diagram describing a schematic configuration of the document conveying apparatus 100.

In addition to the configuration described above, the document conveying apparatus 100 further includes a first A/D converter 140a, a second A/D converter 140b, a driving device 141, an interface device 142, a storage device 143, a CPU (Central Processing Unit) 150, etc.

The first A/D converter 140a performs analog-to-digital conversion on the analog image signal outputted from the first imaging device 118a to generate digital image data, and outputs the same to a CPU 150. Similarly, the second A/D converter 140b performs analog-to-digital conversion on the analog image signal outputted from the second imaging device 118b to generate digital image data, and outputs the same to the CPU 150. These digital image data are used as a read-in image. Hereinafter, a first A/D converter 140a and a second A/D converter 140b may be sometimes collectively referred to as an A/D converter 140.

The driving device 141 includes one or more motors, and rotates the paper feed roller 112, the retard roller 113, the first conveying roller 115, and the second conveying roller 120 according to a control signal from the CPU 150 for performing conveyance of a document.

The interface device 142 has, for example, an interface circuit conforming to a serial bus such as USB (Universal Serial Bus). The interface device 142 is electrically connected with a (not illustrated) information processing device, such as a personal computer, and a portable information terminal, and transmits and receives the read-in image and various kinds of information. Alternatively, instead of the interface device 142, a communication unit having an antenna for transmitting and receiving radio signals, and a radio communication interface circuit for transmitting and receiving signals through a radio communication path according to a predetermined communication protocol may be used. The predetermined communication protocol is, for example, a wireless LAN (Local Area Network).

The storage device 143 includes a memory device, such as a RAM (Random Access Memory), and a ROM (Read Only Memory), a fixed disk drive such as a hard disk, or a portable storage device, such as a flexible disk, and an optical disk. In the storage device 143, a computer program, a database, tables, etc., used for various kinds of processing of the document conveying apparatus 100 are stored. The computer program may be installed on the storage device 143 from a computer-readable, non-transitory medium such as a compact disk read only memory (CD-ROM), a digital versatile disk read only memory (DVD-ROM), etc., by using a well-known setup program, etc. Further, a read-in image is stored in the storage device 143.

The CPU 150 operates based on a program stored in advance in the storage device 143. Instead of the CPU 150, a DSP (digital signal processor), a LSI (large scale integration), etc., may be used. Instead of the CPU 150, an ASIC (Application Specific Integrated Circuit), a FPGA (Field-Programming Gate Array), etc., may be used.

The CPU 150 is connected with the display device 107, the first sensor 111, the ultrasonic sensor 114, the second sensor 117, the third sensor 119, the first imaging device 118a, the second imaging device 118b, the first A/D converter 140a, the second A/D converter 140b, the driving device 141, the interface device 142, the storage device 143, etc., and controls these modules. The CPU 150 performs driving control of the driving device 141, document reading control of the imaging device 118, etc., and acquires a read-in image.

As described above in detail, in the document conveying apparatus 100, the guiding tray 105 is disposed on the document tray 103, when the document tray 103 is at the working position, and is disposed so as to be stored between the document tray 103 and the body, when the document tray 103 is at the storage position. The distance between the document tray 103 and the guiding tray 105 decreases, when the document tray 103 is at the storage position compared to the case at the working position. Therefore, it is possible to reduce the size of the document conveying apparatus 100 when not in use.

Since the document conveying apparatus 100 has a plurality of document trays each having a document stacking face with a different width, even when a plurality of documents with a width different from each other are collectively placed on the document tray, it becomes possible to suppress inclined conveyance (occurrence of skew) of a small-width document. This makes it possible with respect to the document conveying apparatus 100, that generation of a read-in image of an inclined document, or occurrence of jamming of the document sheets is suppressed. In addition, it is not any more necessary for a user to set the side guides according to the width of each document, which can improve the user convenience of the document conveying apparatus 100.

Although preferable embodiments have been described above, this application is not limited to the embodiments. For example, in the guiding tray 105, the groove 131b may be not formed and the third document stacking face 105b may be omitted. Further, in the guiding tray 105, it is also possible that the groove 131b is not formed integrally with the base material 131, rather the third document stacking face 105b is formed with a member that is swingably supported at the base material 131 similarly to the swinging member 132. By this means, the member constituting the third document stacking face 105b may be also compactly stored, when the document tray 103 is at the storage position, and therefore the size of the document conveying apparatus 100 when not in use may be further reduced.

Figure 9:
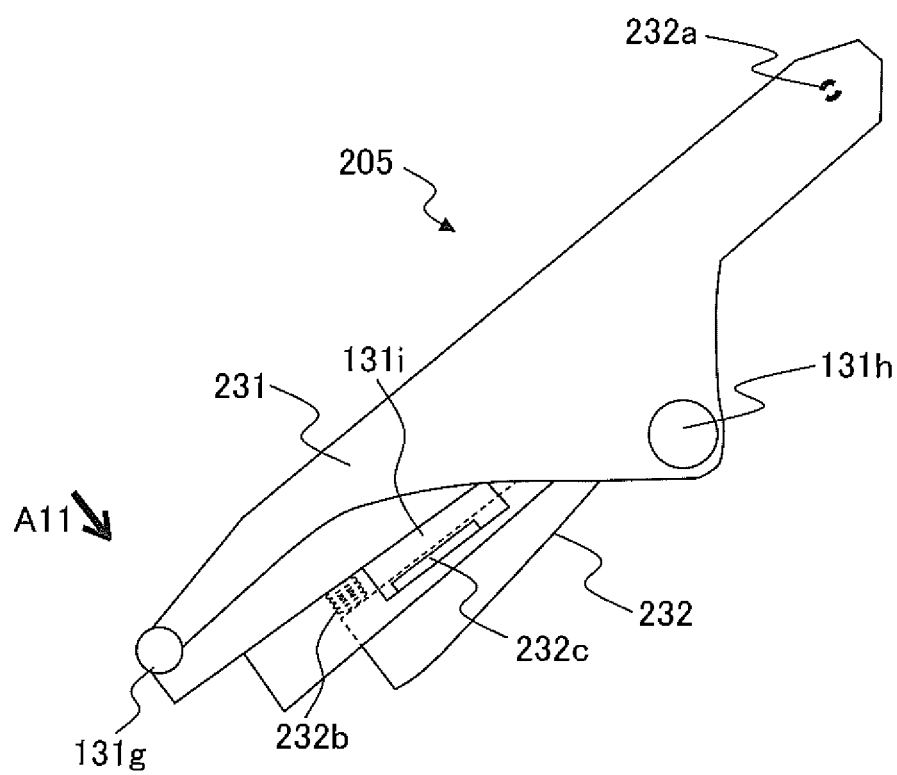
FIG. 9 is a diagram illustrating another example of a guiding tray 205.

FIG. 9 is a diagram illustrating another example of a guiding tray 205.

In the guiding tray 205 illustrated in FIG. 9, a compression coil spring 232b is provided as an elastic member between the base material 231 and the swinging member 232 instead of the torsion coil spring 132b. The compression coil spring 232b is placed near the end of the swinging member 232 opposite to the axis member 232a. As illustrated in FIG. 9, a force is applied to the swinging member 232 in the direction of the arrow A11 by the compression coil spring 232b, and therefore, when the document tray 103 is at the working position, the swinging member 232 swings in the direction of the arrow A11. Meanwhile, when the document tray 103 is at the storage position, similarly to the case where the torsion coil spring 132b is used, the swinging member 232 is pressed by the document tray 103 to swing in the direction opposite to the arrow A11. In the above case, a sponge member may be used as an elastic member in place of the compression coil spring 232b.

As described in detail above, also in a case where a compression coil spring 232b or a sponge member is used as the elastic member between the base material 231 and the swinging member 232, it has become possible to reduce the size of the document conveying apparatus when not in use.

Figure 10A:
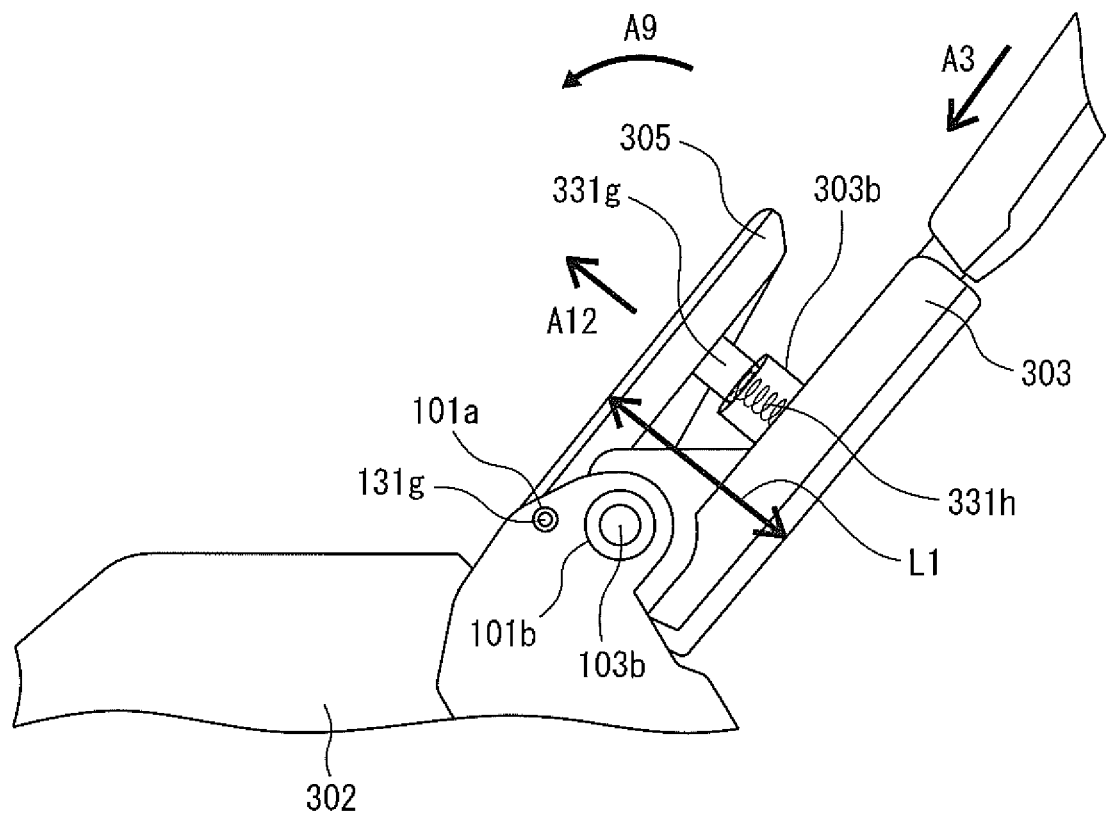
FIG. 10A is a diagram illustrating another example of a second support member.
Figure 10B:
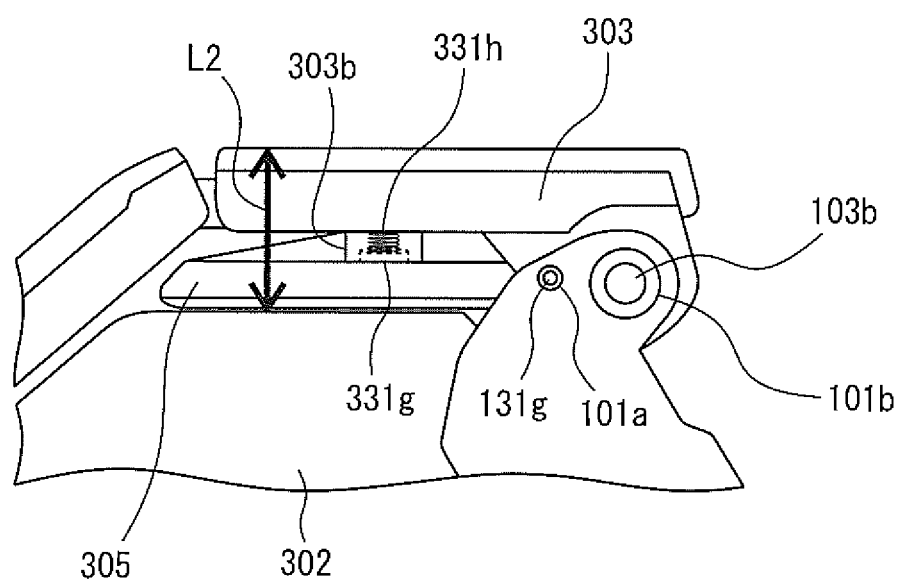
FIG. 10B is a diagram illustrating another example of a second support member.

FIGS. 10A and 10B are diagrams illustrating another example of a second support member.

An engaging member 131h is not provided on the guiding tray 305 illustrated in FIGS. 10A and 10B, and a guide member 103c is not provided on the document tray 303. Instead, on the guiding tray 305, first columnar members 331g are provided at both the ends in a direction A4 orthogonal to the document conveying direction A3, and on the document tray 303, at positions facing the first columnar members 331g second columnar members 303b are provided. The first columnar member 331g is disposed inside the second columnar member 303b so as to move along the second columnar member 303b, and a compression coil spring 331h is provided as an elastic member between the lower base of the first columnar member 331g and the lower base of the second columnar member 303b. The compression coil spring 331h is an example of a second support member that supports the guiding tray 305. Accordingly, the guiding tray 305 moves in the direction orthogonal to the first document stacking face 103a while maintaining the relationship that its upper surface is substantially parallel to the first document stacking face 103a.

As illustrated in FIG. 10A, a force in the direction of the arrow A12 is applied to the first columnar member 331g by the compression coil spring 331h. Therefore, when the document tray 303 is at the working position, the compression coil spring 331h expands such that the guiding tray 305 is apart from the document tray 303 by the first distance L1 in supporting the guiding tray 305. On the other hand, as illustrated in FIG. 10B, when the document tray 303 is at the storage position, the guiding tray 305 is pressed against the upper casing 302. As a result, the compression coil spring 331h contracts such that the guiding tray 305 is apart from the document tray 303 by the second distance L2 in supporting the guiding tray 305.

Also in such a case, a sponge member may be used instead of the compression coil spring 331h as the elastic member.

As described in detail above, also in a case where an elastic member is used as the second support member, the size of the document conveying apparatus when not in use may be reduced. However, when an elastic member is used as the second support member, the structure becomes complicated because of use of the elastic member, and therefore it is more preferable to use an engaging member 131h and a guide member 103c as the second support member.

Figure 11A:
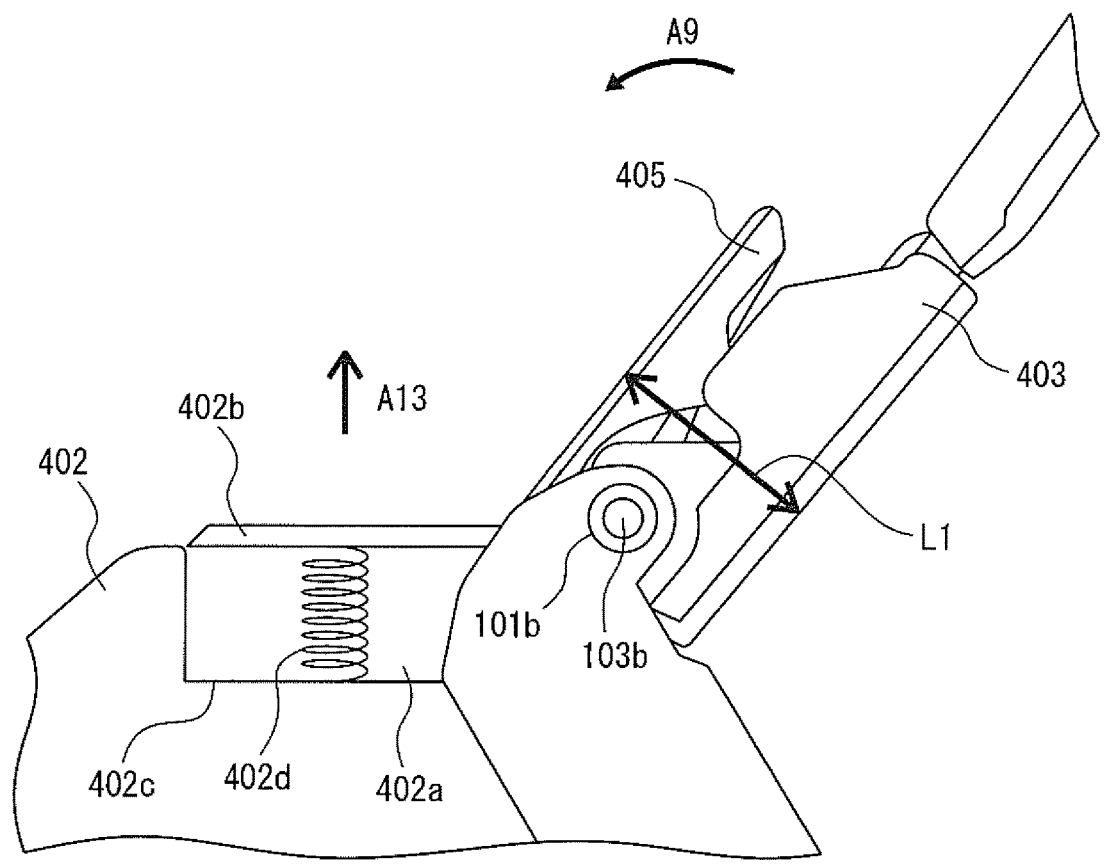
FIG. 11A is a diagram illustrating another example of a guiding tray 405.
Figure 11B:
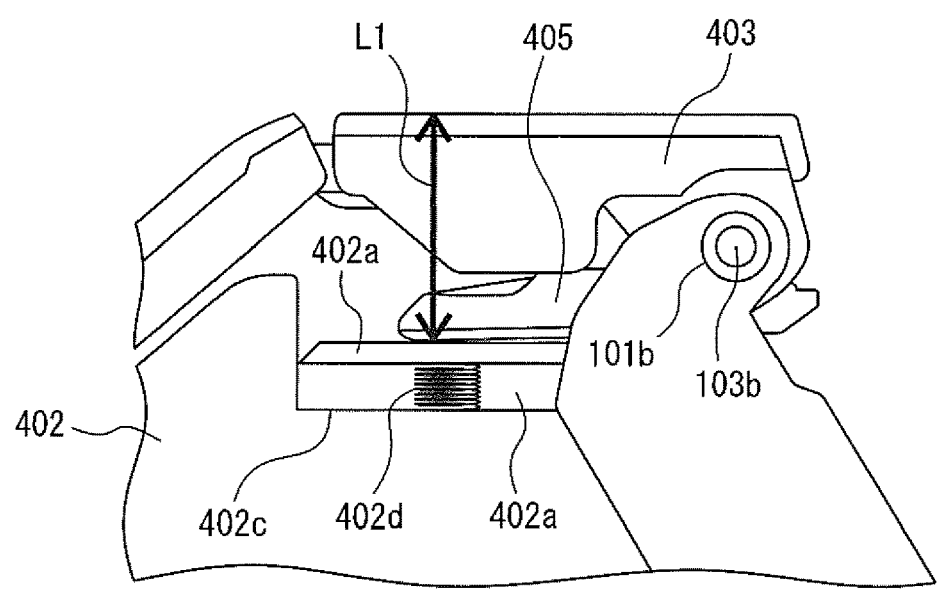
FIG. 11B is a diagram illustrating another example of a guiding tray 405.

FIGS. 11A and 11B are diagrams illustrating another example of a guiding tray 405 and an upper casing 402.

As illustrated in FIGS. 11A and 11B, the guiding tray 405 is not provided with a first axis member 131g and an engaging member 131h, the lower casing 401 is not provided with a second bearing member 101b, and the document tray 403 is not provided with a guide member 103c. The guiding tray 405 rotates together with the document tray 403 in association with the rotational movement of the document tray 403.

Instead, the upper casing 402 is provided with a cavity 402a, and a compression coil spring 402d as an elastic member between the upper base 402b and the lower base 402c of the cavity 402a. The upper base 402b is provided movably in the vertical direction while maintaining the parallel relationship with the lower base 402c.

As illustrated in FIG. 11A, a force in the direction of the arrow A13 is applied to the upper base 402b by the compression coil spring 402d. As illustrated in FIG. 11B, when the document tray 403 is at the storage position, the upper base 402b is pressed by the guiding tray 405, and the compression coil spring 402d is contracted. In this case, the distance L1 between the guiding tray 405 and the document tray 403 does not change between the case where the document tray 403 is at the working position and the case where it is at the storage position. However, in the case where the document tray 403 is at the storage position, since the guiding tray 405 is stored inside the upper casing 402, the size of the document conveying apparatus may be reduced when not in use. Also in such a case, since an elastic member becomes necessary and the structure becomes complicated, it is more preferable that the engaging member 131h and the guide member 103c are used as a second support member.

According to the document conveying apparatus, it is possible to reduce the size of a document conveying apparatus having a plurality of document trays when not in use.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A document conveying apparatus comprising:
   a body;
   a document tray having a first document stacking face;
   a guiding tray having a second document stacking face, wherein a width of the second document stacking face is smaller than a width of the first document stacking face;
   a first support member that movably supports the document tray between an open position where a document is placed on the first document stacking face and a close position where the document tray is closed; and
   a second support member that supports the guiding tray, wherein
   the second support member positions the guiding tray at a first distance from the document tray, when the document tray is at the open position, wherein
   the second support member positions the guiding tray at a second distance from the document tray, when the document tray is at the close position, and wherein the second distance is smaller than the first distance, wherein
   the guiding tray includes an engaging member, and wherein
   the second support member includes a guide member that engages with the engaging member and movably guides the guiding tray when the document tray moves from the open position to the close position.

2. The document conveying apparatus according to claim 1, wherein the second document stacking face is swingably supported by the guiding tray.

3. The document conveying apparatus according to claim 1, wherein the guiding tray includes a retaining member that retains a document placed on the second document stacking face.

4. The document conveying apparatus according to claim 3, wherein the retaining member has a notch at an edge in a direction orthogonal to a document conveying direction.

5. The document conveying apparatus according to claim 1, wherein the document tray has a side guide mounted movably in a direction orthogonal to a document conveying direction, regulates the width direction of a document placed on the first document stacking face, and wherein
   the guiding tray has a stopper that prevents entry of the side guide into a position facing the second document stacking face on the document tray in the direction orthogonal to the document conveying direction.

6. The document conveying apparatus according to claim 1, wherein the body includes a conveying roller that conveys a document placed on the first document stacking face or a document placed on the second document stacking face, and thereafter conveys another document when documents are placed on both the first document stacking face and the second document stacking face.

7. A document conveying apparatus comprising:
   a body;
   a document tray having a first document stacking face;
   a guiding tray having a second document stacking face, wherein a width of the second document stacking face is smaller than a width of the first document stacking face;
   a first support member that movably supports the document tray between an open position where a document is placed on the first document stacking face and a close position where the document tray is closed; and
   a second support member that supports the guiding tray, wherein
   the second support member positions the guiding tray at a first distance from the document tray, when the document tray is at the open position, wherein
   the second support member positions the guiding tray at a second distance from the document tray, when the document tray is at the close position, and wherein the second distance is smaller than the first distance, and wherein
   the second support member is an elastic member that expands when the document tray is at the open position and contracts when the document tray is at the close position.

8. The document conveying apparatus according to claim 7, wherein the second document stacking face is swingably supported by the guiding tray.

9. The document conveying apparatus according to claim 7, wherein the guiding tray includes a retaining member that retains a document placed on the second document stacking face.

10. The document conveying apparatus according to claim 9, wherein the retaining member has a notch at an edge in a direction orthogonal to a document conveying direction.

11. The document conveying apparatus according to claim 7, wherein the document tray has a side guide mounted movably in a direction orthogonal to a document conveying direction, regulates the width direction of a document placed on the first document stacking face, and wherein
the guiding tray has a stopper that prevents entry of the side guide into a position facing the second document stacking face on the document tray in the direction orthogonal to the document conveying direction.

12. The document conveying apparatus according to claim 7, wherein the body includes a conveying roller that conveys a document placed on the first document stacking face or a document placed on the second document stacking face, and thereafter conveys another document when documents are placed on both the first document stacking face and the second document stacking face.

13. A document conveying apparatus comprising:
a body;
a document tray having a first document stacking face;
a guiding tray having a second document stacking face, wherein a width of the second document stacking face is smaller than a width of the first document stacking face;
a first support member that movably supports the document tray between an open position where a document is placed on the first document stacking face and a close position where the document tray is closed; and
a second support member that supports the guiding tray, wherein
the second support member positions the guiding tray at a first distance from the document tray, when the document tray is at the open position, wherein
the second support member positions the guiding tray at a second distance from the document tray, when the document tray is at the close position, and wherein the second distance is smaller than the first distance, wherein
the guiding tray includes a retaining member that retains a document placed on the second document stacking face, and wherein
the retaining member includes a notch at an edge in a direction orthogonal to a document conveying direction.

14. The document conveying apparatus according to claim 13, wherein the second document stacking face is swingably supported by the guiding tray.

15. The document conveying apparatus according to claim 13, wherein the document tray has a side guide mounted movably in a direction orthogonal to a document conveying direction, regulates the width direction of a document placed on the first document stacking face, and wherein
the guiding tray has a stopper that prevents entry of the side guide into a position facing the second document stacking face on the document tray in the direction orthogonal to the document conveying direction.

16. The document conveying apparatus according to claim 13, wherein the body includes a conveying roller that conveys a document placed on the first document stacking face or a document placed on the second document stacking face, and thereafter conveys another document when documents are placed on both the first document stacking face and the second document stacking face.

* * * * *